(12) United States Patent
Pool

(10) Patent No.: US 9,866,803 B2
(45) Date of Patent: Jan. 9, 2018

(54) INTRINSICALLY SAFE VIDEO INSPECTION SYSTEM

(71) Applicant: Leonard Pool, San Diego, CA (US)

(72) Inventor: Leonard Pool, San Diego, CA (US)

(*) Notice: Subject to any disclaimer, the term of this patent is extended or adjusted under 35 U.S.C. 154(b) by 150 days.

(21) Appl. No.: 15/018,860

(22) Filed: Feb. 8, 2016

(65) Prior Publication Data

US 2016/0234466 A1 Aug. 11, 2016

Related U.S. Application Data

(62) Division of application No. 12/803,004, filed on Jun. 16, 2010, now Pat. No. 9,258,535.

(60) Provisional application No. 61/268,920, filed on Jun. 16, 2009.

(51) Int. Cl.
| | |
|---|---|
| *H04N 7/22* | (2006.01) |
| *H04N 5/232* | (2006.01) |
| *G06T 7/00* | (2017.01) |
| *H04N 5/225* | (2006.01) |
| *H04N 7/18* | (2006.01) |

(52) U.S. Cl.
CPC ............ *H04N 7/22* (2013.01); *G06T 7/0004* (2013.01); *H04N 5/2256* (2013.01); *H04N 5/23241* (2013.01); *H04N 7/183* (2013.01); *H04N 2005/2255* (2013.01)

(58) Field of Classification Search
CPC .......... G06T 7/0004; H04N 2005/2255; H04N 5/2256; H04N 5/23241; H04N 7/183; H04N 7/22
USPC ........................................................ 348/82
See application file for complete search history.

(56) References Cited

U.S. PATENT DOCUMENTS

| | | |
|---|---|---|
| 4,000,941 A | 1/1977 | Okajima et al. |
| 4,701,575 A | 10/1987 | Gupta et al. |
| 4,866,516 A | 9/1989 | Hibino |
| 5,057,783 A | 10/1991 | Gubisch |
| 5,195,392 A | 3/1993 | Moore et al. |
| 5,475,420 A | 12/1995 | Buchin |
| 6,141,037 A | 10/2000 | Upton |
| 6,685,159 B1 | 2/2004 | Schnell |
| 6,801,696 B2 | 10/2004 | Davis et al. |
| 6,820,653 B1 | 11/2004 | Schempf et al. |
| 7,236,342 B2 | 6/2007 | Vazach et al. |
| 7,312,716 B2 | 12/2007 | Kothari et al. |

(Continued)

FOREIGN PATENT DOCUMENTS

JP H1014863 A 1/1998

*Primary Examiner* — Francis G Geroleo
(74) *Attorney, Agent, or Firm* — Gary L. Eastman, Esq.; Eastman & McCartney LLP

(57) ABSTRACT

An intrinsically safe video inspection system intended for use in a Class I, Zone 0 area is capable of visually surveying hazardous area locations; where the potential for fire or explosion exists because of gases, dust, or easily ignitable fibers in the atmosphere. The intrinsically safe camera of the present invention has the distinct ability to be used all areas that require increased safety and works in various hazardous environments, allowing users the ability to remotely view and inspect various mines, silos, and storage tanks. The inspection system includes a low power, high 3.2 megapixel resolution camera with digital zoom capability that allows for the close inspection and examination and utilizes an LED fiber light pipe for illumination needs. The video inspection system of the present invention provides for the illumination in various cavity sizes, while reducing the risk of unintended accidents.

16 Claims, 4 Drawing Sheets

(56) References Cited

U.S. PATENT DOCUMENTS

| | | |
|---|---|---|
| 7,385,692 B1 | 6/2008 | Nguyen |
| 7,869,944 B2 | 1/2011 | Deaton et al. |
| 2007/0070340 A1 | 3/2007 | Karpen |
| 2007/0132842 A1 | 6/2007 | Morris |
| 2007/0177010 A1 | 8/2007 | Murata |
| 2008/0158755 A1 | 7/2008 | Sato |
| 2008/0287936 A1 | 11/2008 | Stinson et al. |

INTRINSICALLY SAFE VIDEO INSPECTION SYSTEM

RELATED APPLICATIONS

This application is a Divisional of, and claims the benefit of priority to, U.S. Utility patent application Ser. No. 12/803,004 entitled "Intrinsically Safe Video Inspection System" filed in Jun. 16, 2010, and currently co-pending, which in turn claims the benefit of priority to U.S. Provisional Patent Application Ser. No. 61/268,920 entitled "Intrinsically Safe Video Inspection System" filed Jun. 16, 2009.

FIELD OF THE INVENTION

The present invention relates generally to video cameras and inspection systems which include video cameras. The present invention is particularly, though not exclusively, related to video inspection systems for use in hazardous environments and especially those hazardous environments having a volatile vapors with a high risk of fire or explosion.

BACKGROUND OF THE INVENTION

With the technological advances that have been made in camera technology, including the development of miniature and solid state digital cameras, it has been increasingly commonplace to incorporate video cameras into ordinary diagnostic equipment. One specific application of the modern cameras is in the field of robotics, and remote inspection systems. For instance, cameras may be incorporated into robotically controlled electronics manufacturing systems for inspection of solder or weld joints, for examining the proper placement of components in electronic assembly, and other uses where visual feedback would be advantageous.

Another practical application of modern camera technology includes the inspection of hazardous environments. For instance, a video inspection system can provide a more detailed inspection than the naked eye, can be exposed to environments incompatible with human life, and can often identify defects long before they become apparent to less sophisticated inspection systems. These defects, if left unnoticed, can result in significant safety hazards, and in some environments, can lead to catastrophe. One such environment is in the inspection of tanks used for the transport and storage of hazardous mated is, such as fuel tanks, oil tanks, or other dangerous chemicals.

Hazardous environments that contain volatile gasses, vapors, or liquids are typically classified by zones. Specifically, a Zone 2 environment has no risk of fire or explosion, Zone 1 has a higher risk of fire or explosion, and Zone 0 has a high risk of fire or explosion. Equipment is typically certified to operate in specific zones. For instance, one device may be certified only for use in Zone 2 environments, while another device may be certified for use in Zone 1. Typically, devices certified for Zone 1 can also be used in Zone 2 since Zone 2 has less stringent requirements for safety than Zone 1.

In order to satisfy the requirements for Zone 1 and Zone 0, certain electrical and mechanical design requirements must be met. These design requirements are primarily focused on safety concerns, and include the limitations to avoid excessive heat, fire, spark, static, or other sources of ignition. Devices that are designed for use within the Zone 0 environment are considered "intrinsically safe."

Intrinsic safety is a protection model employed in potentially explosive atmospheres and relies on the electrical apparatus being designed so that it is unable to release sufficient energy by either thermal or electrical means that can cause an ignition of a flammable gas. A published discussion of this protection technique can be found at www.iec.ch. Part of IEC 60079 specifies the construction and testing of intrinsically safe apparatus intended for use in an explosive gas atmosphere and for associated apparatus, which is intended for connection to intrinsically safe circuits which enter such atmospheres. These are locations where ignitable concentrations of flammable gases, vapors, liquids, dust, or easily ignitable fibers are present continuously, or are present for long periods of time.

Historically, video systems have been excluded from being used in Zone 0 applications due to the potential for an explosion, Typical video systems include sufficient voltage potentials and power uses that can create excessive sparking, localized heat sources, and in some cases, a circuit failure could result in a fire developing within the video system itself causing a primary explosion. This is particularly dangerous when considering the highly volatile Zone 0 environments where a primary explosion would necessarily result in a more catastrophic secondary explosion.

In order to inspect Zone 0 or Zone 1 environments, it is estimated that millions of dollars spent each year are expended in the opening, gas-freeing and inspection of vapor and gas storage and transportation tanks. This estimate does not take into account the substantial amount of time required to prepare permits, secure the area, evacuate the tank, and send in a person wearing HAZMAT equipment inside the tank with conventional recording and inspection equipment. Many of these are unplanned and could have been unnecessary.

In light of the above, it would be advantageous to provide a video inspection system that offers a multifold increase in process efficiency from reduction in time and cost in tank opening, gas-freeing, and inspection. In addition, it would be advantageous to provide a video inspection system that offers quantitative and standardized inspection analysis and results which are not subject to human judgment, error or variability. Cost savings associated with such a video inspection system would include a substantial reduction in labor costs that are typically associated with the insertion of trained inspectors into these confined spaces and the unnecessary ventilation and re-preservation of tanks.

SUMMARY OF THE INVENTION

The present invention includes an intrinsically safe video inspection system intended for use in a Class I, Zone 0 area. The system of the present invention is capable of visually surveying hazardous area locations; where the potential for fire or explosion exists because of gases, dust, or easily ignitable fibers in the atmosphere. Examples of these areas include mines, fuel tanks, oil and gas production plants, and pipelines.

Due to the extreme conditions and the potential of loss or damage to persons and machines, these unique areas demand regular assessment; such as verification of content, corrosion, failures in the materials or construction and unwanted objects. Additionally, these applications have restrictive conditions such as poor lighting, access, and a greater potential for hazardous or explosive gases and/or fluids.

The intrinsically safe camera of the present invention has the distinct ability to be used all areas that require increased safety. There are other commercially available inspection systems yet none meet the conditions of certified "intrinsically Safety is Type".

The intrinsically safe camera system works in various hazardous environments, allowing users the ability to remotely view and inspect various mines, silos, and storage tanks. Because it is a low power solution and high 3.2 megapixel resolution, it can be used in other applications such as submersibles, surveillance, oil rigs, etc. The digital zoom capability allows for the close inspection and examination of specific areas with greater detail and provides a lighter weight solution than using an optical zoom. Utilizing an LED fiber light pipe for illumination needs, the video inspection system of the present invention provides for the illumination in various cavity sizes, while reducing the risk of unintended accidents.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein.

DETAILED DESCRIPTION OF A PREFERRED EMBODIMENT

Figure 1:
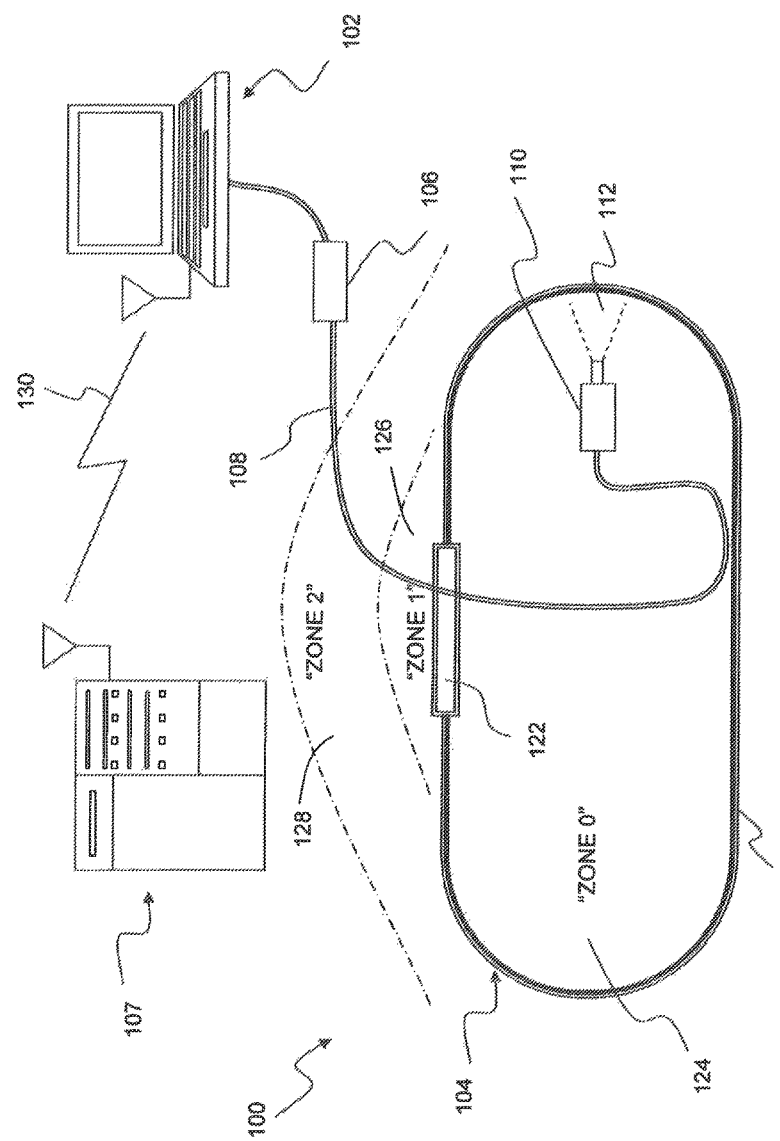
FIG. 1 is a system level block diagram of the intrinsically safe camera system of the present invention showing a hazardous environment having Zone 0, Zone 1, and Zone 2 ratings, being inspected by the intrinsically safe camera in communication with a local computer, and communicating with a remote base computer.

Referring initially to FIG. 1, a system level block diagram of the intrinsically safe camera system of the present invention is shown and generally designated 100. System 100 includes a host computer 102 or other video display device, a hazardous environment 104, a cable conditioning module 106 and an interconnecting cable 108 extending to the intrinsically safe camera assembly 110 having a video image area 112.

Hazardous environment 104 may, in some instances, include a chamber or tank 120 having an internal space 124 designated as Zone 0. This represents an extremely hazardous environment. Adjacent opening 122 of chamber 120 is a less hazardous area 126 designated as Zone 1, and a least hazardous area 128 designated Zone 2.

As shown in this Figure, cable 108 extends from the host computer or other video display device and cable conditioning module 106, through opening 122 and into Zone 0, 124. As can be appreciated, it is important that cable 108 be made to avoid any short circuits, avoid creating any sparks or conducting any static electricity whatsoever. Any one of these conditions could result in a primary explosion within the Zone 0 environment.

In a preferred embodiment, cable 108 may be an electric cable of twisted shielded pairs using a communication protocol typical of the USB 2.0 standard, having low power, and fault protection on each end of the cable. For instance, on the camera assembly end of the cable 108, the system may be made intrinsically safe by incorporating a limiting resistor on the USB line having a resistance of 4.7 ohms at 5 volts DC. Also, parallel and redundant Zener diodes may be used across signal and power lines to eliminate any over-voltage conditions. Further, DC to DC converters may be used to convert low voltage signals from cable 108 to higher voltages for use in the camera assembly 110.

Additionally or alternatively, conditioning module 106 may also include a limiting resistor of a value determined by the length of the cable 108 and the acceptable voltage drop across the cable. Parallel and redundant Zener diodes may also be used to avoid over-voltage conditions. Conditioning module 106 may also include a USB signal extender thereby allowing for longer cable 108 lengths, and may also step up transmitting power for longer cable lengths.

The intrinsically safe camera of the present invention also provides of the auto-cable detection using techniques known in the art, including but not limiting to auto-voltage adjustment, automatic gain control (AGC), and the like. This can be accomplished within conditioning module 106, and can also provide supervisory functions, such as over-voltage protection, over current protection, signal level boosting and detection of USB transmit and receive, video signal levels, and may have user-observable signal indicators, such as LED lights to indicate status of the signals. Also, module 106 may change signal types from one communication standard to another depending on user or system requirements.

In order to avoid the creation of sparks, static, and the effects of wear and tear on the cable 108, it may be jacketed with chemical and corrosion resistant materials, such as plastic shielding having anti-static properties. Also, cable 108 may be made from braided and shielded cabling with a greater than 95% shielding to avoid stray radiation and the build-up of static electricity. Steel tubing and corrugated armor may also be implemented to create a durable and fault-free cable 108.

The intrinsically safe camera assembly 110 of the present invention must be capable of use in the hazardous environment having Zone 0, Zone 1, and Zone 2 ratings. In this application, camera assembly 110 may be used to inspect the interior of chamber 120, and the video inspection data is then transmitted along cable 108 to the host computer 102.

In some cases, it will be advantageous for host computer 102 to communicate with a remote base computer 107, such as reporting inspection data, or receiving inspection instructions. In such circumstances, communication link 130, such as a wireless communication link, provides a communication path between the host computer and a base computer. This link can be accomplished using any known communication protocol without departing from the present invention, including but not limited to transmission over wired and wireless channels, and the Internet.

Figure 2:
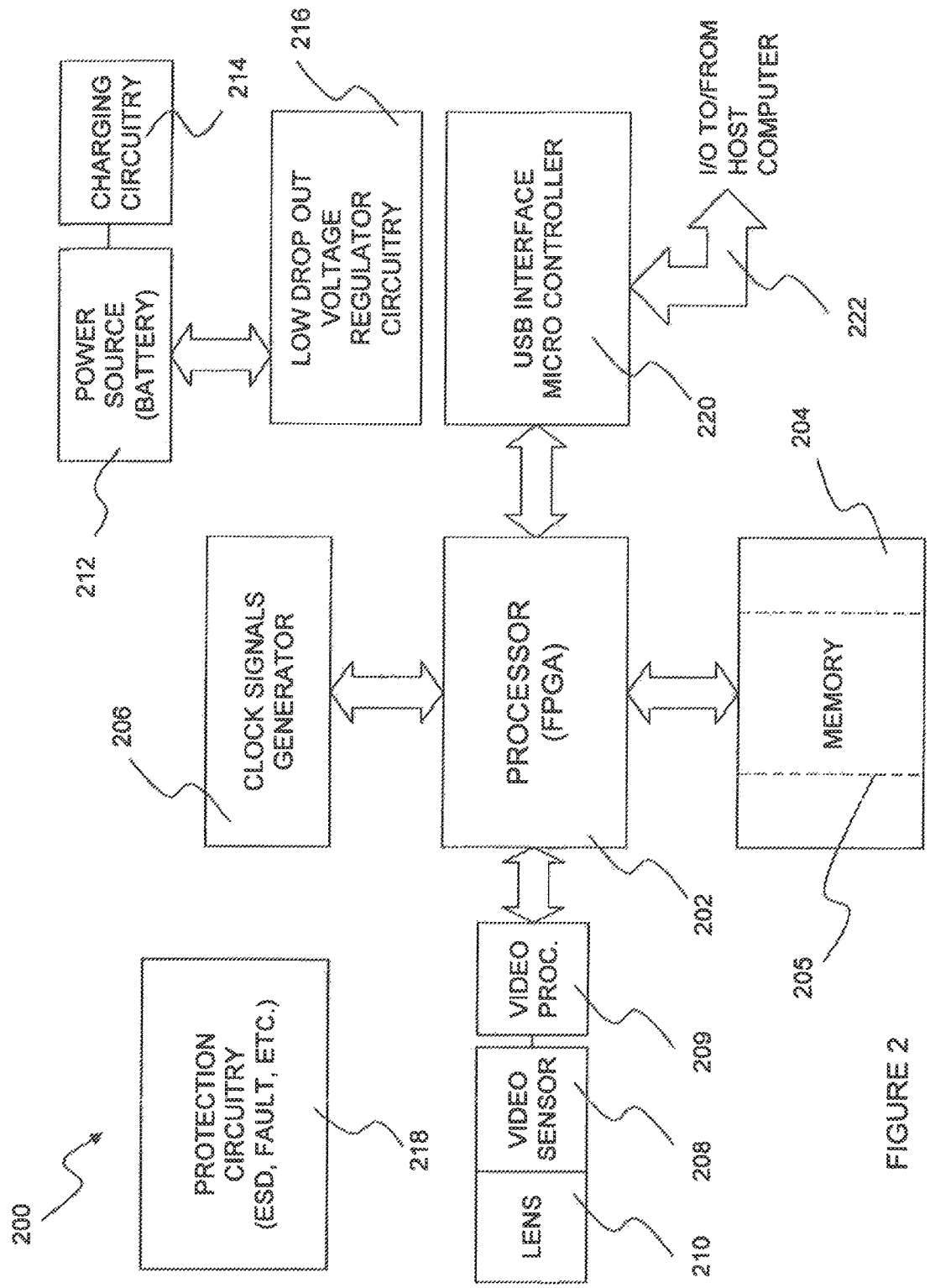
FIG. 2 is a block diagram of the intrinsically safe camera of the present invention showing the protection circuitry and power source in combination with a processor having input from a video sensor, and in response to relevant clock signals, storing and transmitting through a USB interface, the image or video data to the host computer.

Referring now to FIG. 2, a block diagram of the intrinsically safe camera of the present invention is shown and generally designated 200. Camera 200 includes a processor 202, such as a field programmable gate array (FPGA). It is to be appreciated that other processors known in the art may be used, including microprocessors and microcontrollers. A memory 204 is provided for storage of program data and to enable storage of video images and files. Memory 204, in a preferred embodiment is a solid state storage media, such as electrically erasable programmable read only memory (EEPROM), battery backed random access memory (RAM), or other media known in the art and suitable for use herein.

Memory 204 in a preferred embodiment is RAM. This RAM may be partitioned into multiple memory blocks (shown by dashed line 205). In a segmented configuration, memory 204 may be used to ping-pong images. For instance, an image may be captured in bank 1 while reading out an image from bank 2. When that image transfer is done, an image can then be read out of bank 1 while a subsequent image is stored in bank 2. In this fashion, the image capture and transmit process can be expedited.

Clock signal generator 206 provides all clocking signals to camera 200, and facilitates the transmission and capturing of image data from video sensor 208. Video sensor 208 receives images from lens 210 and converts this image data to digital data for use by processor 202 and for storage and transmission. A video processor 209 may be included for compression and video enhancement of image and video signals from video sensor 208.

A power source 212, such as a battery, receives electrical charge from charging circuitry 214, and low drop out voltage regulator circuit 216 maintains suitable voltage levels within camera 200. Protection circuitry 218 provides the electrical isolation and protection necessary to avoid electro static discharge (ESD), electrical faults, and other conditions unacceptable within a Zone 0 environment.

A communication interface 220 such as a USB interface and microcontroller receives data from processor 202 or memory 204, and transmits this data to the host computer (not shown this Figure), This link is provided through I/O To/From Host Computer 222. In a preferred embodiment, the communication link between camera assembly 200 and host computer 102 is a standard USB communication link.

Wireless communication between camera assembly 200 and host computer 102 is also contemplated. This communication could include Bluetooth, WiFi, ultra wide band (UWB) and mesh network technologies. In such applications including wireless communication, antennas could pose problems for spark creation. In such applications, it would be advantageous to incorporate the antenna into the chassis of camera 200. In this case, the antenna would be molded into the chassis and would be made of insulated plastics, which would prevent electrical shocks. Alternatively, the antenna could be coated in spark-resistant coatings.

Figure 3:
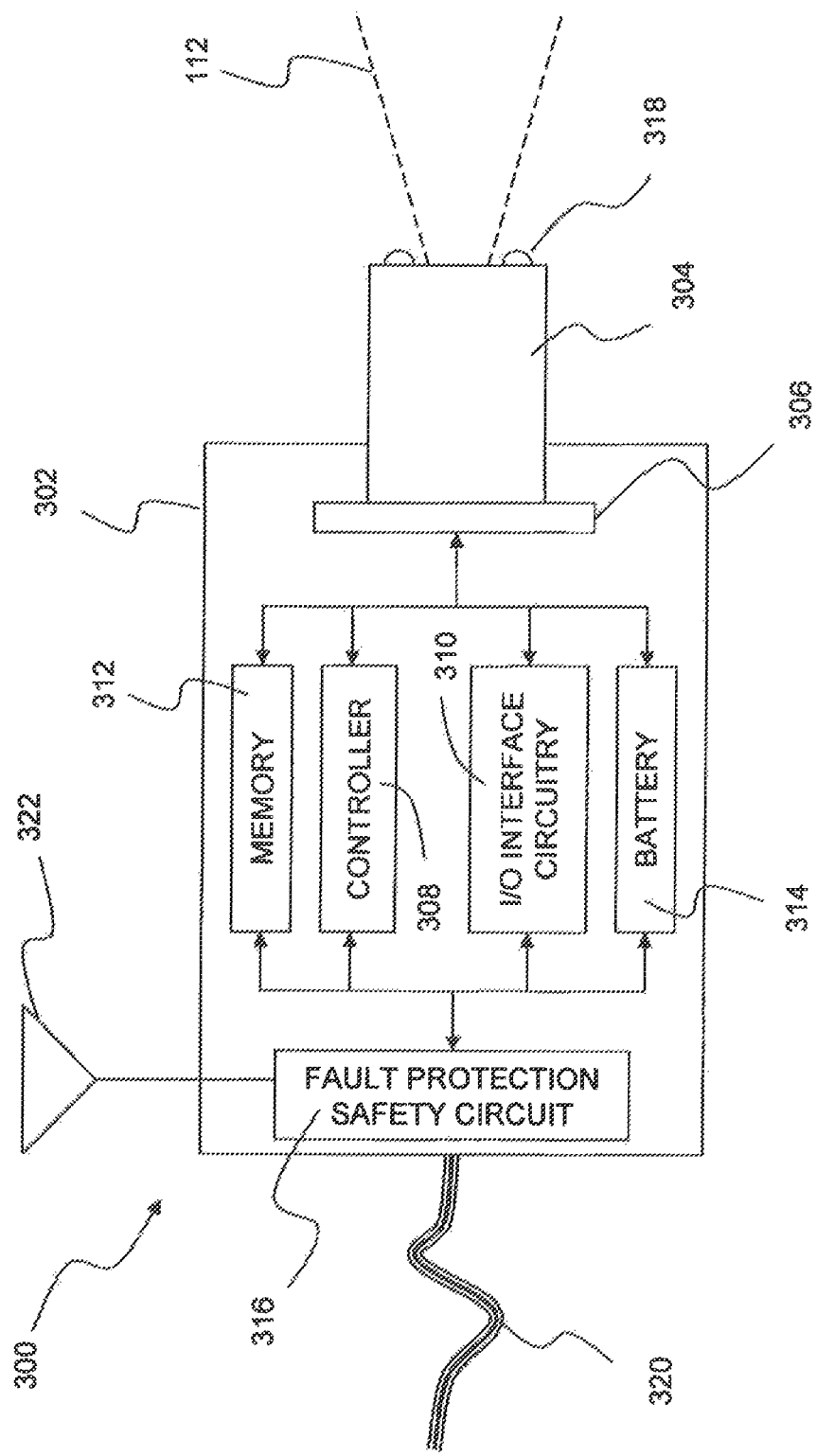
FIG. 3 is a diagrammatic representation of the intrinsically safe camera system of the present invention showing the camera assembly having a lens assembly adjacent an imaging device, and capturing video from an image area, relaying that information to a controller, memory, and input/output interface, and then transmitting this information through fault protection safety circuits to the host computer.

Referring now to FIG. 3, a diagrammatic representation of the intrinsically safe camera system of the present invention is shown and generally designated 300. Camera 300 includes camera chassis 302 having a lens assembly 304 adjacent an imaging device 306. Imaging device 306, in a preferred embodiment, is a high-resolution charge coupled device (CCD) image panel. Imaging device 306 receives images from a video image area 112 through lens assembly 304.

The imaging device 306 converts the images to a digital electrical signal which is then communicated to controller 308, memory 312 and input/output circuitry 310. Once image or video signals are presented to input/output circuitry 310, it can then be transmitted through fault protection safety circuit 316 to electrical cable 320 for transmission to the host computer 102 (not shown in this Figure).

It is also contemplated in the present invention that the communication link over electrical cable 320 may be replaced by a wireless communication signal, such as that transmitted from antenna 322 back to the host computer 102. In this configuration, the wireless video and image signals may be relayed from camera 300 to host computer 102 using a variety of communication protocols known in the art.

Adjacent to assembly lens 304 is a plurality of light sources 318, such as light emitting diodes (LEDs) that selectively illuminate the video image area 112. This light source 318 may be wavelength changing, intensity changing, or a combination of wavelength and intensity changing in order to most accurately illuminate areas for inspection.

Figure 4:
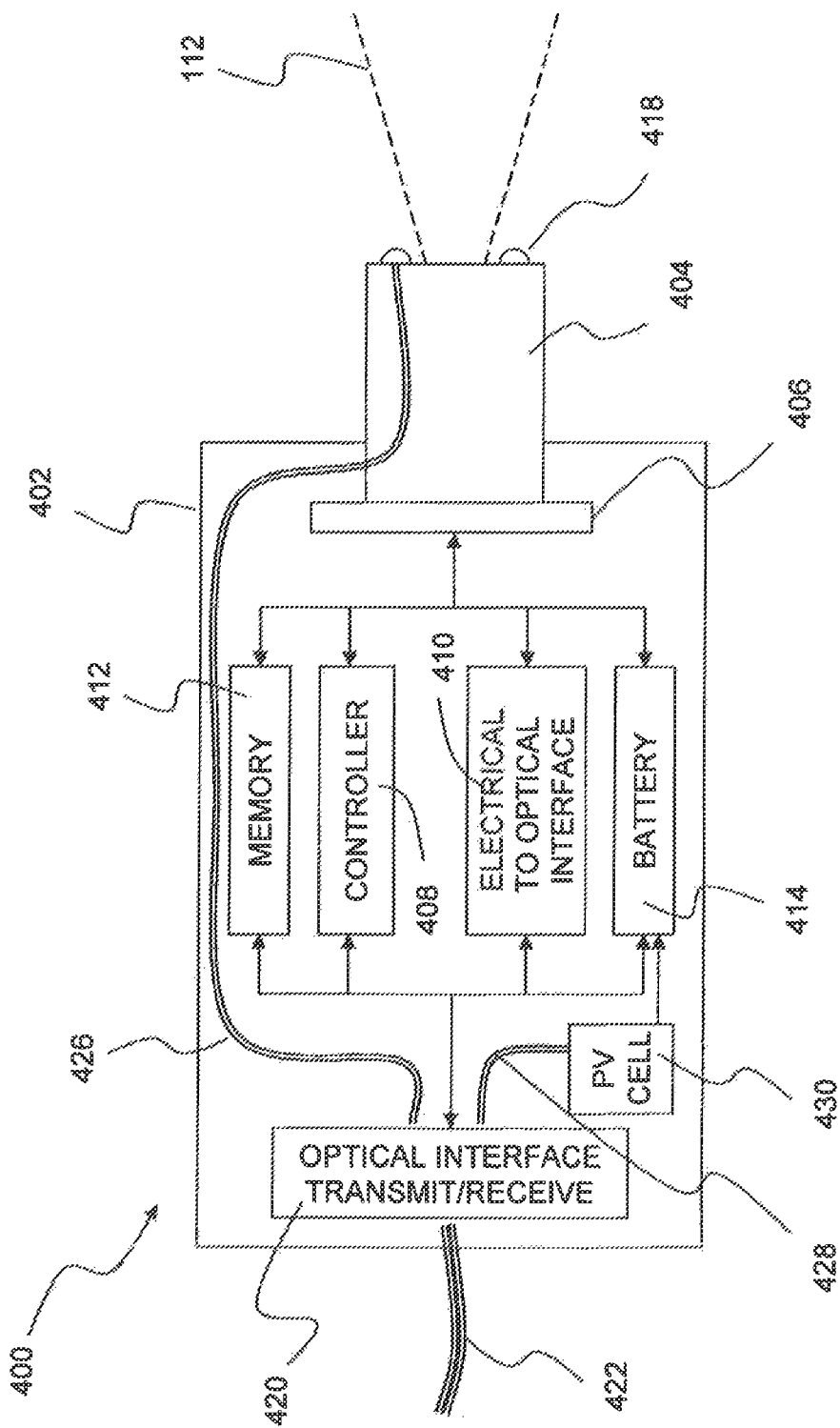
FIG. 4 is a diagrammatic representation of an alternative embodiment of the intrinsically safe camera system of the present invention showing the camera assembly having a lens assembly adjacent an imaging device, and capturing video from an image area, relaying that information to a controller, memory, and input/output interface, converting this information to an optical signal and then transmitting this information optically through an optical transmitter/receiver to the host computer.

FIG. 4 is a diagrammatic representation of an alternative embodiment of the intrinsically safe camera system of the present invention generally designated 400. Camera 400 includes a camera chassis 402 having a lens assembly 404 adjacent an imaging device 406, and capturing video from video image area 112. This image data is available to controller 408, memory 412, and electrical to optical interface 410.

Electrical to optical interface 410 is an electrical to optical conversion device, which receives electrical digital data from memory 412, controller 408 and imaging device 406 and converts it into an optical data stream for transmission through optical interface transmit/receive 420 to optical fiber 422. In such an application, cable conditioning module 106 converts the received optical signals from camera 400 to electrical signals for transmission to host computer 102, and converts electrical signals from host computer 102 into optical signals for transmission to camera 400. Converting this information between electrical and optical signals can be accomplished through an electrical-optical-electrical (EOE) interface.

Optical fiber 422 may include an optical high speed serial bus interface (bi-directional communication link) between the camera assembly 400 and the host computer 102. For instance, bi-direction communication such as IEEE 1394 interface may be used. This optical link will eliminate any transmission of electrical signals between the camera assembly and the host computer. This is particularly advantageous when considering the Zone 0 environmental risks, and the problems inherent with spark and electromagnetic radiation created by the transmission of electrical signals along a conductive cable. In fact, when utilizing optical fibers for communication, even a breach of the cable sheathing will not result in a spark or fire hazard.

Battery 414 provides local power to camera 400 and may, in a preferred embodiment, be removed from the camera chassis 402 for charging. Alternatively, battery 414 may be charged within camera 400 through inductive or electrical plug-type charging means. Alternatively, optical signals may be received from optical interface 420 and a portion of the illumination may be split off through fiber 428, such as a light pipe, to a photovoltaic (PV) cell 430. PV cell 430 derives electrical power from any light within fiber 428 thereby providing power for the camera, yet having no electrical connections made through optical fiber 422.

Optical fiber 422 may also provide the lighting required for camera 400. For instance, optical fiber 422 may include a light pipe that 426, in addition to one or more digital data channels, may also include a steady state light source. This source can be received by optical interface 420 and fed into light pipe 426 for transmission to light emitters 418 adjacent lens assembly 404, This light source may be wavelength and intensity selectable to provide a variety of lighting options for inspections. Specifically, the wavelengths may vary, and may include visible, ultraviolet (UV) and infrared (IR) light sources. Utilizing LED fiber light pipe solution provides several benefits. The primary benefit is helping yield a low power solution. The secondary benefit is providing various light levels to illuminate various cavity sizes. Also, using a fiber bundle provides a lighter weight camera system making it easier to operate.

Alternative lighting solutions could include, in a preferred embodiment, may include a local illumination, such as LED lighting contained within chassis 402 or lens assembly 404. Alternatively, light pipes, such as light pipe 426, may be used to channel light from a remotely located xenon lamp. This would provide a high intensity light for imaging purposes, however, eliminate the high-power lamps in the camera assembly 400. Instead, these high power lamps may be maintained outside the hazardous Zone 0. Utilizing an LED fiber light pipe allows illumination in various cavity sizes, while reducing the risk of unintended accidents.

In addition to the wavelength changing illumination and focusing lens assembly 404, each camera 400 may be equipped with a motion control device. Specifically, this motion control could incorporate pneumatic and/or hydraulic motion device, and could include pan, tilt and rotation motion, and linear drives. These devices incorporating pneumatics and/or hydraulics would present no risk for a Zone 0 environment as there would be no likelihood of spark or explosion. Alternatively, electrical motion control devices, such as brushless motors or micro electro mechanical systems (MEMS) may be incorporated to provide motion control to camera 400.

Referring back to FIG. 2 for reference, the video inspection system of the present invention 100 is intrinsically safe, and includes a camera 200 that meets intrinsically safe design standards of IES 60079-11 of the year 2009. Using innovative design techniques, a low power and high resolution intrinsically safe camera has been created to incorporate key protection circuitry in the areas of limiting current in case of a short circuit and over voltage protection circuitry to minimize the potential of sparking. With the potential for large data flows over the USB port, video compression may be used to manage data information exchange between the camera and the host computer or remote communication device.

The camera of the present invention utilizes video compression techniques for sending multiple images per second, and also has the ability to send raw video at a lower image rate. The communication protocol implemented in the present invention contains extra I/O headers to allow for adding different features, such as providing the ability of using a motorized zoom lens.

One principal feature of the design of the present invention is low power operation, Specifically, components were selected based on low power requirements, and capabilities to perform various functions such as safety and performance. For instance, the video sensor 208, such as a CCD imaging device, was selected on the basis of low power and video resolution capabilities. The quarter inch sensor has a video format of 2048×1536 pixels at 15 frames per second (fps) with good image quality, yet operates at less than 300 mW. Utilizing the high resolution capabilities, alone and in combination with mechanical 210 with mechanical zoom, allows for implementing digital and manual zoom to see areas up close. Digital zoom alone provides a lighter weight camera system with no moving electrical components that may cause sparks or mechanical zoom failure thereby increasing safety and improving reliability.

Utilizing internal camera memory 204 allows the operation of different video schemes. For instance, raw video may be delivered at a reduced frame rate. In this configuration, the memory 204 may be used as a dual buffer allowing video sensor data from video sensor 208 to be written into one location in the memory 204 and the data in another location being sent to the host computer or remote communication devices via the USB interface micro-controller 220.

The processor 202, such as the FPGA, is the central hub between the key components: video sensor 208, memory 204, and USB micro-controller 220. It allows for data to flow seamlessly at different clock and data rates generated by clock signals generator 206. A portion of the processor 202 is used to assist in compressing the video images from sensor 208 on the fly. Also, the processor 202 directs control information from the USB interface micro-controller 220 to either video sensor 208 or memory 204.

The USB interface micro-controller 220 provides the ability of communicating with other USB communications ports or hubs. For example, the intrinsically safe camera of the present invention may communicate to the host computer 102, such as a standardized Laptop PC, via the USB port. Control and configuration information can be sent from the host computer 102 to USB interface micro-controller 220 via I/O To/From host computer link 222. A principal benefit is being able to transfer camera images from the camera 200 to the host computer 102 at rates up to 480 Mbps. Another key feature of using the USB port is being able to provide electrical power and control the operation of the camera. For instance, the user of the present invention has the option of sending commands to change from manual to auto features such as exposure control, white balance, and black level, Other user controls may include image size, image quality, frame rate and amount of video compression.

Different clocks are required because of the distinct requirements of the video sensor 208 and USB interface micro controller 220 devices. The multiple clocks provided by clock signals generator 206 allows the devices to operate at their own internal clock rates and provide appropriate data and video information that can be shared and distributed to other parts of the camera system. The processor 202 also receives clock signals to help properly align video image data as it comes in from the video sensor 208 and is transmitted to host computer 102 through USB interface micro-controller 220.

Low voltage drop out regulator circuitry 216 are included to ensure that stable voltages are provided to the respective components within camera 200. It provides stable output voltages despite varying input voltages (2.5-5.5 VDC), and provides protection against input reverse current, thermal, and short-circuit.

Protection circuitry 218 may include a current limiting resistor and 3 parallel Zener diodes. The current limiting resistor ensure the camera current is limited if there is a short circuit. The Zener diodes provide voltage protection if the voltage is greater than 5V. Each of these safety features contributes to the overall safety of the intrinsically safe camera of the present invention.

A primary focus of the design of the present invention is to provide an intrinsically safe camera system that will work in explosive gas atmospheric environments. This allows users to remotely view and inspect gaseous hazardous areas such as mines, grain silos, oil refineries, petroleum storage tanks, fuel bays of ships, trucks and cars, etc.

The intrinsically safe camera system is low power and can be used in low power applications. It has been designed to operate at less than 1 watt and provide 3.2 megapixel of resolution. Using a low power motorized lens, it can be used in many environments, such as submersibles, surveillance, oil rigs, etc. Images can be captured and delivered in raw or various compression levels, providing users different levels of image detail and image rates.

In a typical operation of the intrinsically safe camera of the present invention, the camera is attached to a host computer 102, which is outside the intrinsically safe Zone 0, through the USB port. The host computer's USB port provides power and communication to the camera. Upon powering up of the camera, the camera will come up in the last known configuration and await commands from the computer.

The user selects and runs the camera graphical user interface (GUI) program on the computer. Once a communication link occurs between the computer and camera, the operator can begin downloading, storing and viewing images. Selecting various program options will allow the camera to be configured for different modes of operations. For example, using image control, the user can zoom in and out to view specific details of an image area. Or, the operator can change the image quality to show more or less detail by changing image quality settings. It is anticipated that the user will use the default mode for general purpose viewing and recording.

The intrinsically safe camera of the present invention may be equipped with post processing capabilities for the retrieved video image data. Furthermore, it may utilize variable light intensities and color and may be equipped with alarm features, spectral defect detectors, and machine vision capabilities, which all cooperate to assist a user in identifying defects.

The intrinsically safe camera may be enclosed in an explosion proof chassis or housing, Strategically placed around the housing will be the light source to provide uniform illumination in dark areas. The chassis mount is designed to allow easy head rotation both vertically and horizontally by the operator. Also using extension sticks, the intrinsically safe camera of the present invention can be lowered or raised to different heights for maximal video viewing.

The intrinsically safe camera system of the present invention will work in various hazardous environments, allowing users the ability to remotely view and inspect various mines, silos, and storage tanks. Because it is a low power solution with a high power 3.2 megapixel resolution, it can be used in other applications, such as submersibles, surveillance, oil rigs, etc. The digital zoom capability allows looking at areas with greater detail and provides a lighter weight solution than using a mechanical zoom.

While there have been shown what are presently considered to be preferred embodiments of the present invention, it will be apparent to those skilled in the art that various changes and modifications can be made herein without departing from the scope and spirit of the invention.

I claim:

1. An intrinsically safe video inspect on system for inspecting hazardous zones with a flammable and volatile atmosphere, comprising:
    a host computer hating a processor, memory, clock, a communication module and a video display device, and configured to provide a graphical user interface for interfacing;
  a graphical user interface configured to run on the host computer;
    a cable conditioning module having a light source and in electrical connection with said communication module of said host computer and configured to transform electrical signals to optical signals and optical signals to electrical signals;
    an intrinsically safe camera assembly comprising:
    an imaging sensor optically coupled to a lens, low powered components;
  intrinsic safety protection circuitry comprising redundant Zener diodes across signal lines;
    an optical interface in optical communication with the cable conditioning module;
    a photovoltaic cell in optical communication with the optical interface, the photovoltaic cell configured to derive electrical power using light from the optical interface, the electrical power used to power the low powered components of the intrinsically safe camera assembly; and
  light emitters in optical communication with the optical interface and configured to illuminate an area within visual range of the intrinsically safe camera assembly; and
  an interconnecting cable extending between said cable conditioning module and said intrinsically safe camera assembly, wherein the interconnecting cable consists of one or more fiber optic cables.

2. The video inspection of claim 1, wherein the host computer and the intrinsically safe camera assembly further comprise a means for wirelessly communicating.

3. The video inspection system of claim 2, wherein the intrinsically safe camera assembly further comprises an antenna.

4. The video inspection system of claim 3, wherein the antenna is molded into the intrinsically safe camera assembly's housing.

5. The video inspection system of claim 1, further comprising a light source located externally to the intrinsically safe camera assembly's housing and in optical communication with the intrinsically safe camera assembly's housing through one or more of the one or more fiber optic cables.

6. The video inspection system of claim 5, wherein the light source is wavelength and intensity selectable.

7. The video inspection system of claim 1, further comprising a motion control device that includes pan, tilt, rotation, and linear motion.

8. The video inspection system of claim 7, wherein the motion control device utilizes pneumatics to control motion.

9. The video inspection system of claim 7, wherein the motion control device utilizes hydraulics to control motion.

10. The video inspection system of claim 7, wherein the motion control device utilized micro electro mechanical systems to control motion.

11. The video inspection system of claim 1, wherein the intrinsically safe camera assembly is further configured with zoom capabilities.

12. The video inspection system of claim 1, further comprising controls for exposure time, white balance, black level, focus, image size, image quality, frame rate, and amount of video compression.

13. The video inspection system of claim 1, further comprising post processing capabilities for video image data retrieved from the intrinsically safe camera assembly.

14. The video inspection system of claim 1, further comprising alarm features, spectral defect detectors, and machine vision capabilities configured to identify defects.

15. The video inspection system of claim 1, further comprising a remote base computer in communication with the host computer.

16. The video inspection system of claim 15, wherein the remote base computer is configured to receive inspection data from, and send inspection instructions, to the host computer.

* * * * *

UNITED STATES PATENT AND TRADEMARK OFFICE
CERTIFICATE OF CORRECTION

| | | |
|---|---|---|
| PATENT NO. | : 9,866,803 B2 | Page 1 of 1 |
| APPLICATION NO. | : 15/018860 | |
| DATED | : January 9, 2018 | |
| INVENTOR(S) | : Leonard Pool | |

It is certified that error appears in the above-identified patent and that said Letters Patent is hereby corrected as shown below:

In the Claims

Column 10, Line 2, "video inspect on system" should be changed to --video inspection system--.

Column 10, Line 5, "hating a processor" should be changed to --having a processor--.

Column 10, Lines 17-18, "an imaging sensor optically coupled to a lens, low powered components;" should be changed to:
--an imaging sensor optically coupled to a lens;
low powered components;--.

Column 10, Line 61, "motion control device utilized" should be changed to --motion control device utilizes--.

Signed and Sealed this
Twentieth Day of February, 2018

Andrei Iancu
*Director of the United States Patent and Trademark Office*